United States Patent
Qiao et al.

(10) Patent No.: US 12,434,344 B1
(45) Date of Patent: Oct. 7, 2025

(54) TOOL WEAR STATE MONITORING METHOD AND SYSTEM BASED ON MULTIPLE TYPES OF SIGNALS

(71) Applicant: IDQ Science and Technology (Guangdong, Hengqin) Co., Ltd., Zhuhai (CN)

(72) Inventors: Qian Qiao, Zhuhai (CN); Xinpeng Que, Zhuhai (CN); Ying Pan, Zhuhai (CN); Dawei Guo, Zhuhai (CN); Lapmou Tam, Zhuhai (CN)

(*) Notice: Subject to any disclaimer, the term of this patent is extended or adjusted under 35 U.S.C. 154(b) by 0 days.

(21) Appl. No.: 19/266,096

(22) Filed: Jul. 10, 2025

Related U.S. Application Data

(63) Continuation of application No. PCT/CN2025/088019, filed on Apr. 9, 2025.

(30) Foreign Application Priority Data

Feb. 26, 2025 (CN) .......................... 202510219463.5

(51) Int. Cl.
*B23Q 17/09* (2006.01)
*G05B 19/4065* (2006.01)

(52) U.S. Cl.
CPC ..... *B23Q 17/0971* (2013.01); *B23Q 17/0966* (2013.01); *B23Q 17/098* (2013.01); *G05B 19/4065* (2013.01)

(58) Field of Classification Search
CPC ............ B23Q 17/0971; B23Q 17/0966; B23Q 17/098; B23Q 17/0952; B23Q 23/00; G05B 19/4065; G05B 19/4183; G05B 23/0283; G05B 23/0221; G05B 2219/37434; G01M 13/045; G01M 13/028; G01M 13/00; G01M 5/0033; G01M 15/12; G06F 17/18; G06F 18/2178; G06N 3/02; G06N 3/088; G06N 3/044; G06N 20/00; G06N 20/20; G06N 5/022; G06N 7/02
USPC .......... 73/660, 104, 579; 700/175, 177, 174, 700/280; 702/34, 183, 56, 150, 182, 41, 702/185, 85, 104, 189, 33, 184, 35, 42, 1,
(Continued)

(56) References Cited

U.S. PATENT DOCUMENTS

2020/0233396 A1* 7/2020 Kurokami ............ B23Q 17/098
2022/0097192 A1* 3/2022 Nishikawa ......... B23Q 17/0995
2024/0066653 A1* 2/2024 Zhang .................. G06N 3/0985

FOREIGN PATENT DOCUMENTS

CN 105374367 A * 3/2016 ............ G10L 25/21
CN 114905336 A * 8/2022 ............ B23Q 17/098
(Continued)

*Primary Examiner* — Jeffrey P Aiello

(57) ABSTRACT

The present invention provides a tool wear state monitoring method and system based on multiple types of signals, and relates to the technical field of data processing. The method includes: obtaining data of a cutting force, an acoustic emission signal and a vibration signal, and extracting a plurality of statistical features from data of the cutting force and the acoustic emission signal; extracting a singularity feature from the vibration signal by combining a singularity analysis with a wavelet transform; building a tool wear state monitoring model based on a random forest, using an obtained feature to perform preliminary training, and outputting a wear prediction result; and based on the real-time data of the cutting force, the acoustic emission signal and the vibration signal, monitoring the wear state of the tool through the refined model.

10 Claims, 2 Drawing Sheets

(58) Field of Classification Search
USPC ..... 702/44, 127, 84, 77, 66, 57; 703/1, 2, 6; 706/15, 21, 25
See application file for complete search history.

(56) References Cited

FOREIGN PATENT DOCUMENTS

| | | | | | |
|---|---|---|---|---|---|
| CN | 116638374 | A | * | 8/2023 | ......... B23Q 17/0957 |
| EP | 3506125 | A1 | * | 7/2019 | ........... G06F 17/148 |
| JP | H0651261 | B2 | * | 7/1994 | ........... B23Q 17/098 |

* cited by examiner

TOOL WEAR STATE MONITORING METHOD AND SYSTEM BASED ON MULTIPLE TYPES OF SIGNALS

CROSS-REFERENCE TO RELATED APPLICATIONS

The present application is a continuation of International Application No. PCT/CN2025/088019, filed on Apr. 9, 2025, and claims priority to Chinese Patent Application No. 202510219463.5, filed on Feb. 26, 2025, the entire disclosure of which is incorporated herein by reference.

TECHNICAL FIELD

The present invention relates to the technical field of data processing, and in particular, to a tool wear state monitoring method and system based on multiple types of signals.

BACKGROUND

Tool wear is one of key factors for machining accuracy and product quality in a manufacturing industry. In the precision manufacturing process, the wear state of the tool directly affects the machining quality, production efficiency and the service life of a device. With the continuous development of industrial automation and intelligent manufacturing, a tool wear monitoring technology has gradually become an important means to improve the production efficiency and reduce costs. Currently, there are a variety of methods for monitoring tool wear, which cover multiple types such as acoustic signals, vibration signals, temperature signals and current signals. With the development of technology, single signal monitoring is unable to meet the demand for high precision and high efficiency. Therefore, a comprehensive monitoring method based on multiple types of signals has gradually become a research hotspot, which can achieve a more comprehensive and accurate evaluation on the wear state of the tool.

With the advancement of technology, monitoring methods based on a fusion of multiple types of signals have gradually emerged in recent years. These methods improve the accuracy and reliability of tool wear monitoring by integrating and comprehensively analyzing characteristics from various signals, e. g., acoustic, vibration, temperature and current.

However, although existing multi-signal fusion methods can make up for the shortcomings of a single signal, they still face the problems of complex signal processing and high computational demands, making it difficult to meet the real-time requirements. Additionally, due to the nonlinearity and uncertainty of the tool wear process, the existing methods have a low monitoring accuracy when signal changes are not significant in an early stage of wear.

SUMMARY OF THE INVENTION

In order to solve the technical problems, although the existing multi-signal fusion methods can make up for the shortcomings of a single signal, they still face the problems of complex signal processing and high computational demands, making it difficult to meet the real-time requirements, and due to the nonlinearity and uncertainty of the tool wear process, the existing methods have a low monitoring accuracy when the signal changes are not significant in the early stage of wear, the present invention provides a tool wear state monitoring method and system based on multiple types of signals.

The technical solutions provided in the embodiments of the present invention are as follows.

In a first aspect, a tool wear state monitoring method based on multiple types of signals according to an embodiment of the present invention includes:

S1: obtaining cutting force data, acoustic emission signal data and vibration signal data of a tool in a machining process;

S2: extracting a plurality of statistical features from the cutting force data and the acoustic emission signal data;

S3: extracting a singularity feature from the vibration signal data by combining a singularity analysis with a wavelet transform;

S4: building a tool wear state monitoring model based on a random forest;

S5: using the extracted statistical features and singularity feature as an input to preliminarily train the tool wear state monitoring model, and outputting preliminary tool wear results;

S6: evaluating whether the preliminary tool wear result meets a preset condition; if yes, proceeding to S9; otherwise, proceeding to S7;

S7: using a preliminarily trained tool wear state monitoring model to evaluate the importance of each statistical feature and the singularity feature to determine key features that affect a tool wear state;

S8: based on the key features, refining the tool wear state monitoring model;

S9: obtaining real-time cutting force data, real-time acoustic emission signal data and real-time vibration signal data; and S10: based on the real-time cutting force data, the real-time acoustic emission signal data and the real-time vibration signal data, monitoring the tool wear state through the trained tool wear state monitoring model.

In a second aspect, a tool wear state monitoring system based on multiple types of signals according to an embodiment of the present invention includes:

a processor;

a memory having a computer-readable instruction stored thereon, the computer-readable instruction, when executed by the processor, implementing the tool wear state monitoring method based on multiple types of signals according to the first aspect.

In a third aspect, a computer-readable storage medium according to an embodiment of the present invention has a computer program stored thereon, the program, when executed by the processor, implementing the tool wear state monitoring method based on multiple types of signals according to the first aspect.

The technical solutions provided in the embodiments of the present invention have at least the following beneficial effects.

(1) In the embodiments of the present invention, by extracting the statistical features and combining the wavelet transform with the singularity analysis, the processing flow of an original signal is effectively simplified, and the computational complexity is significantly reduced. By using the tool wear state monitoring model built through the random forest, large-scale features can be efficiently processed, thereby avoiding excessive consumption of computing resources and improving the real-time performance of the system and the processing efficiency.

(2) In the embodiments of the present invention, by preliminarily training the model, an effective wear assessment can be provided in the early stage of small signal changes, thereby guaranteeing that a preliminary prediction can be made even when the signal changes are not significant. In addition, by evaluating the importance of features, the key features that affect tool wear are screened out, thereby guaranteeing that the model focuses on the features that can effectively distinguish the wear state even at the early stage of small signal changes. Based on the key features, the model is finely trained, thereby further improving the ability of the model to identify an early wear state, thus significantly improving the monitoring accuracy.

BRIEF DESCRIPTION OF THE DRAWINGS

To describe the technical solutions in the embodiments of the present invention more clearly, the drawings required to describe the embodiments are briefly described below. Apparently, the drawings described below are only some embodiments of the present invention. A person of ordinary skill in the art may further obtain other drawings based on these drawings without creative efforts.

DETAILED DESCRIPTION OF THE EMBODIMENTS

The technical solutions in the present invention will be described below with reference to the drawings.

In the embodiments of the present invention, terms such as "exemplarily" and "for example" are used to indicate an example, an illustration or an explanation. Any embodiment or design described herein as "exemplary" is not necessarily to be construed as preferred or advantageous over other embodiments or designs. Rather, the term "exemplary" is used to specifically present the concept. In addition, in the embodiments of the present invention, the meaning conveyed by "and/or" may be both, or may be either.

In the embodiments of the present invention, "image" and "picture" may sometimes be used interchangeably, and it is to be pointed out that the intended meaning of "image" and "picture" is the same when the difference is not emphasized. "Of", "corresponding, relevant" and "corresponding" may sometimes be used interchangeably, and it is to be pointed out that the intended meaning of "of", "corresponding, relevant" and "corresponding" is the same when the difference is not emphasized.

In the embodiments of the present invention, a subscript, e. g., $W_1$ may sometimes be written in a non-subscript form, e. g., W1. The intended meaning of "$W_1$" and "W1" is the same when the difference is not emphasized.

To make the technical problems to be solved, technical solutions and advantages of the present invention clearer, a detailed description will be made with reference to the drawings and specific embodiments.

Figure 1:
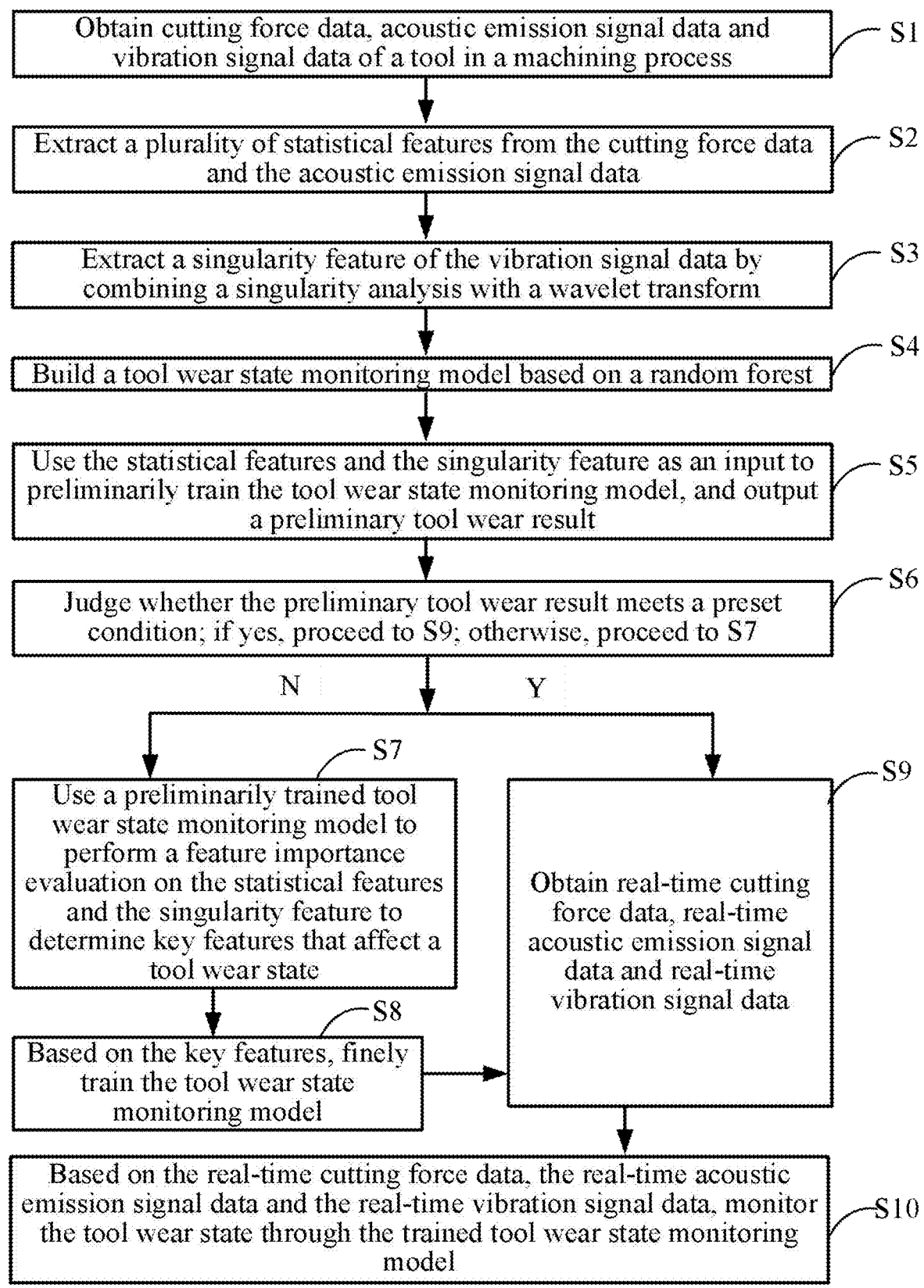
FIG. 1 is a schematic flow diagram of a tool wear state monitoring method based on multiple types of signals according to an embodiment of the present invention.

Reference is made to FIG. 1 of the specification, which shows a schematic flow diagram of a tool wear state monitoring method based on multiple types of signals according to an embodiment of the present invention.

The embodiment of the present invention provides a tool wear state monitoring method based on multiple types of signals. The method may be implemented by a tool wear state monitoring device based on multiple types of signals. The tool wear state monitoring device based on multiple types of signals may be a terminal or a server. The processing flow of the tool wear state monitoring method based on multiple types of signals may include the following steps.

S1: Obtain cutting force data, acoustic emission signal data and vibration signal data of a tool in a machining process.

Specifically, the cutting force data, is obtained by using a force sensor, usually a tri-axial force sensor (which is also referred to as a force/torque sensor) is used to measure a cutting force. The sensor can measure cutting forces of the tool in three directions (X, Y and Z).

For obtaining the acoustic emission signal data, an acoustic emission signal data acquisition system (e. g., an oscilloscope with an appropriate bandwidth, a digitized acoustic emission system) is used for real-time acquisition. Due to the high frequency of an acoustic emission signal, a sampling frequency of 100 kHz or higher is usually required to guarantee precise capturing of the signal.

For obtaining the vibration signal data, an accelerometer or a vibration Sensor (e. g., a piezoelectric sensor) can be used to measure a vibration signal generated by the tool in the machining process.

S2: Extract a plurality of statistical features from the cutting force data and the acoustic emission signal data.

In a possible implementation, the statistical features specifically include:

a maximum value, median, average, standard deviation, peak value and root mean square of the cutting force data; and a maximum value, median, average, standard deviation and root mean square of the acoustic emission signal data.

In the present invention, by extracting the plurality of statistical features of the cutting force data and the acoustic emission signal data, complex time series data can be transformed into concise and structured features, facilitating easier model processing. In addition, different statistical features can describe different aspects of the signals and help the model to understand the signals more comprehensively.

S3: Extract a singularity feature from the vibration signal data by combining a singularity analysis with a wavelet transform.

The singularity analysis is a signal processing technology used to detect mutation points, singularity points or irregularities in the signals. It is particularly suitable for analyzing signals with non-stationary and non-linear features, such as a mechanical vibration signal, an acoustic emission signal and a seismic wave signal.

The wavelet transform is a powerful signal processing tool that can analyze the features of signals at different scales and frequencies. Different from a conventional Fourier transform, the wavelet transform not only provides frequency domain information but also retains the time domain information of the signals. Therefore, it is very suitable for processing non-stationary signals, such as mechanical vibration and acoustic signals.

In a possible implementation, S3 specifically includes:

S301: Use the wavelet transform to analyze multi-scale features of the vibration signal data.

Optionally, a Mexican Hat wavelet is selected for the wavelet transform.

The Mexican Hat wavelet, as a commonly used wavelet function, has a good time-frequency localization property. The Mexican Hat wavelet is selected because of its ability to effectively detect mutations and sharp features in signals, and it is particularly suitable for the analysis of vibration signals.

Specifically, the wavelet transform is performed on the vibration signal data in order to extract features of the signal from multiple scales (frequency intervals). Through the wavelet transform, the components of signals in low-frequency and high-frequency regions can be obtained, thereby revealing multi-scale features of the signals.

S302: Perform a modulus maximum analysis on a wavelet transform coefficient at each scale to determine the number and intensity of maximum points.

It is to be noted that the modulus maximum analysis is performed on the wavelet transform coefficient to extract local maximum points. The maximum points usually correspond to the irregularities or mutations in the signals.

S303: Based on the number and intensity of the maximum points, calculate the Lipschitz index at each scale:

$$\alpha_q = \frac{1}{N_q} \sum_{p=1}^{N_q} \log_2\left(\frac{I(m_p)}{I(m_{p-1})}\right)$$

where $a_q$ represents a Lipschitz index at a q-th scale, $N_q$ represents the number of maximum points at a q-th scale, $m_p$ represents a p-th maximum point, $m_{p-1}$ represents a p−1th maximum point, $I(m_p)$ represents an intensity of the p-th maximum point, $I(m_{p-1})$ represents an intensity of the p−1th maximum point, and log represents a logarithmic function.

The Lipschitz index refers to a mathematical indicator used for describing the smoothness or mutation of a function or a signal at a certain location. The Lipschitz index, as a quantitative description of Lipschitz continuity, is widely applied to the fields of signal analysis, image processing, machining learning, etc., and especially plays an important role in processing non-stationary signals and mutation features.

It is to be noted that the larger $a_q$ is, the smoother a signal is at the q-th scale. Conversely, the smaller $a_q$ is, the more obvious the mutation features of the signal will be at the scale.

In the present invention, the Lipschitz index can quantify the smoothness of a signal. When there is a mutation in the signal (e. g., tool wear, a crack or a device fault), the Lipschitz index will decrease significantly, reflecting that the changes in the signal are no longer smooth. In this way, the Lipschitz index can help the model to automatically identify emergency events or abnormal changes.

S304: Perform weighted averaging on the Lipschitz index at each scale to obtain a comprehensive Lipschitz index of the vibration signal data:

$$HE = \frac{1}{Q} \sum_{q=1}^{Q} \alpha_q \cdot \frac{N_q}{\sum_{k=1}^{Q} N_k}$$

where HE represents the comprehensive Lipschitz index, Q represents a total number of scales decomposed after the wavelet transform, $N_k$ represents the number of maximum points at a k-th scale, and $$\sum_{k=1}^{Q} N_k$$

represents a sum of numbers of maximum points at the Q scales.

In the present invention, the comprehensive Lipschitz index is obtained by weighted averaging the Lipschitz index at each scale, combining mutation information of the signal at different scales and can provide a more comprehensive signal description. Such weighted averaging enables the model to be more sensitive to different frequency bands in the signal, thereby improving the overall prediction ability.

S305: Use the comprehensive Lipschitz index as an output of the singularity feature.

S4: Build a tool wear state monitoring model based on random forest.

The tool wear state monitoring model based on the random forest (RF) isa prediction model that combines machine learning and sensor data, which can monitor the wear state of the tool in real time. The random forest, as a powerful integrated learning method, is widely applied in regression and classification problems. The model is particularly suitable for processing complex and multi-dimensional data involved in tool wear monitoring.

In a possible implementation, S4 specifically includes:

S401: Based on the statistical features, build an original dataset:

$$D = \{(x_1, y_1), (x_2, y_2), \ldots, (x_N, y_N)\}$$

where D represents the original dataset, $x_i$ represents a feature vector of a i-th sample, $y_i$ represents a target variable of the i-th sample, i=1, 2, 3 . . . , N, and N represents the number of samples in the dataset.

S402: Randomly generate a plurality of bootstrapped samples from the original dataset. Each bootstrapped sample contains a plurality of sample data.

In the present: invention, multiple samples generated by the bootstrapped samples enable each tree to be trained on an independent sample set, thereby avoiding the problem of overfitting due to certain specific data points.

S403: Based on each bootstrapped sample, build a plurality of decision trees:

$$T_b(x, h_b) = \sum_{m=1}^{M} \mu_m I(x \dot\in R_m)$$

Where $T_b(x, h_b)$ represents a predicted value of a b-th decision tree at input data x, x represents an input data point, $h_b$ represents a tree structure of the b-th decision tree, M represents a total number of leaf nodes in the decision trees, $\mu_m$ represents an average of target values of all the samples in a m-th leaf node, $R_m$ represents a sample set of the m-th leaf node, I( ) represents an indicator function, $I(x \dot\in R_m)=1$ represents a sample x belonging to the leaf node $R_m$, and $I(x \dot\in R_m)=0$ represents the sample x not belonging to the leaf node $R_m$.

In a possible implementation, S403 specifically includes:

S4031: Select a plurality of splitting variables in the bootstrapped samples.

S4032: Select a split point in each split variable, and divide the split variables into left and right subsets based on the split point:

$$R_1(j,s) = \{X | X_j \leq s\}, R_2(j,s) = \{X | X_j > s\}$$

where $R_1$ represents a split left subset, $R_2$ represents a split right subset, X represents a single sample in the dataset, $X_j$ represents a j-th feature of the sample, and s represents a split point.

In the present invention, by randomly selecting the splitting variables, it ensures that each tree learns different knowledge and avoids all the trees from learning the same features, thereby enhancing the generalization ability of the model.

S4033: Use minimization of a residual sum of squares of each subset as a goal to determine an optimal split point:

$$\min_{j,s} \left[ \min_{\mu_1} \sum_{x_i \in R_1(j,s)} (y_i - \mu_1)^2 + \min_{\mu_2} \sum_{x_i \in R_2(j,s)} (y_i - \mu_2)^2 \right]$$

where min represents minimization, $\mu_1$ represents an average of target variables in the left subset, $x_i$ represents the feature vector of the i-th sample, $R_1$ represents the split left subset, $y_i$ represents the target variable of the i-th sample, $\mu_2$ represents an average of target variables in the right subset, $R_2$ represents the split right subset, j represents a feature, and s represents the split point.

In the present invention, by selecting the optimal split point, i. e., a minimized residual sum of squares of the subsets, the model can split the data into purer subsets, thereby improving the prediction accuracy of the tool wear state.

S4034: Based on the optimal split point, divide a current node into a left sub-node and a right sub-node, and recursively execute steps S4031 to S4034 on the left sub-node and the right sub-node.

S4035: In a case that the number of samples in the bootstrapped samples is lower than a preset number or the depth of the trees reaches a maximum depth, the splitting is stopped and the building of each decision trees is completed.

S404: Combine the decision trees to build the tool wear state monitoring model:

$$\hat{Y}(x) = \frac{1}{B} \sum_{b=1}^{B} T_b(x, h_b)$$

Where $\hat{Y}(x)$ represents a final predicted value of the random forest for the input data x, B represents a total number of trees in the random forest, x represents the input data point, $h_b$ represents the tree structure of the b-th decision tree, and $T_b(x, h_b)$ represents the predicted value of the b-th decision tree at the input data x.

To sum up, by recursively splitting a node, the random forest can extract data features at multiple levels, capture different change modes of the tool wear state, and provide a more comprehensive prediction, thereby reducing a deviation and variance of a single tree, making the model more accurate in predicting tool wear.

S5: Use the statistical features and the singularity feature as the input to preliminarily train the tool wear state monitoring model and output a preliminary tool wear result.

S6: Evaluate whether the preliminary tool wear result meets a preset condition. If so, proceed to S9. Otherwise, proceed to S7.

In a possible embodiment, the preset condition is specifically: the prediction accuracy of the preliminary tool wear result being greater than eighty percent.

S7: Use a preliminarily trained tool wear state monitoring model to evaluate the importance of each statistical feature and singularity feature to determine key features that affect the tool wear state.

The feature importance evaluation is a technology used in machine learning to measure the extent to which each feature contributes to model predictions. By evaluating feature importance, it is possible to identify which features are highly predictive for the target variables, e. g., the tool wear state, thereby optimizing the model, improving prediction accuracy, and reducing redundant features.

In a possible implementation, S7 specifically includes:

S701: Calculate feature importance evaluation values of the statistical features and the singularity feature through the following formula:

$$VarImp(x_i) = \frac{1}{N_T} \sum_{T} \sum_{t \in T : v(s_t) = x_i} p(t) \Delta_i(s_t, t)$$

$$\Delta_i(s_t, t) = i(t) - p_1 i(t_1) - p_2 i(t_2)$$

$$i(t_1) = \sum_{x_i \in R_1} (y_i - \hat{y}_1)^2, i(t_2) = \sum_{x_i \in R_2} (y_i - \hat{y}_2)^2$$

Where $VarImp(x_i)$ represents an importance evaluation value of a feature $x_i$, T represents a decision tree in the random forest, $N_T$ represents a total number of trees in the random forest, $v(s_t)$ represents a feature of a t-th split node, $v(s_t) = x_i$ represents the feature of the t-th split node being split by the feature $x_i$, p(t) represents a sample proportion in a node t, $\Delta_i(s_t, t)$ represents a reduction of a residual sum of squares brought about by the feature $x_i$ when the t-th node is split, i(t) represents a residual sum of squares of the t-th node, $p_1$ represents a sample proportion of a left sub-node, $p_2$ represents a sample proportion of a right sub-node, $i(t_1)$ represents a residual sum of squares of the left sub-node, $i(t_2)$ represents a residual sum of squares of the right sub-node, $R_1$ represents a split left subset, $R_2$ represents a split right subset, $x_i$ represents a i-th sample, $y_i$ represents a target variable of the i-th sample, $\hat{y}_1$ represents an average of target variables of samples in the left subset, and $\hat{y}_2$ represents an average of target variables of samples in the right subset.

In the present invention, by analyzing feature importance, it is possible to intuitively understand how the model makes decisions. For the tool wear monitoring model, it is possible to clearly know which features (e. g., a mean of the cutting force, and a standard deviation of vibration) are most critical to the prediction of the wear state, thereby providing valuable information for maintenance personnel. In addition, the importance of features that are irrelevant or have less impact on the target variables will be underestimated, and the redundant features can be effectively removed, thereby simplifying a subsequent model and improving computational efficiency.

It is to be noted that the larger the value of $\Delta_i(s_t, t)$ is, the more helpful the feature is in predicting the target variables.

S702: Sort the importance evaluation values of each feature in descending order, and select the features corresponding to the feature importance evaluation values with the highest ranking as the key features.

In the present invention, by only using the features that are highly predictive for the target variables, e. g., the tool wear state, the model can reduce the interference of noise and focus on the key features, thereby improving the overall prediction performance of the model. In addition, by clarifying which features (e. g., certain statistical features in the cutting force, vibration or acoustic emission signals) have the greatest impact on a wear prediction, valuable guidance can be provided for further tool management and maintenance. The features are used first to enhance the efficiency of immediate decision making.

S8: Based on the key features, refine the tool wear state monitoring model.

In a possible implementation, a manner for refining the tool wear state monitoring model specifically includes:
  using minimization of a function value of a mean squared error loss function as a goal to refine the tool wear state monitoring model through an improved particle swarm optimization algorithm.

The mean squared error loss function is specifically:

$$MSE = \frac{1}{N}\sum_{i=1}^{N}(y_i - \hat{y}_i)^2$$

where MSE represents the mean squared error loss function, $y_i$ represents a true target value of the i-th sample, $\hat{y}_i$ represents a predicted value of the i-th sample, and N represents a total number of samples in a dataset.

Optionally, the improved particle swarm optimization algorithm specifically includes:

S801: Initialize a particle swarm, which contains a plurality of particles, and each particle represents a feasible solution.

S802: Use a reciprocal value of the mean squared error loss function to improve the fitness function of the particle swarm optimization algorithm.

S803: Calculate a fitness function value for each particle in the particle swarm.

S804: Update the particle with the maximum fitness function value as a global optimal location.

S805: Determine a neighborhood of each particle, and based on particle information in the neighborhood, determine a particle with the maximum fitness function value as a local optimal location.

In the present invention, the search ability of the particles in a local region can be improved through guidance of the local optimal location and sharing of neighborhood information. The particles adjust their own locations based on the particle with the maximum fitness function value in the neighborhood, thereby improving the accuracy of local search.

S806: Update speeds and locations of the particles through the following formula:

$$V_u = \omega V_u + c_1 r_1(\text{Pbset}_u - X_u) + c_2 r_2(\text{Gbset} - X_u)$$

where $V_u$ represents the speed of a particle, $\omega$ represents an inertia weight, $c_1$ and $c_2$ represent acceleration constants, $r_1$ and $r_2$ represent random numbers, $\text{Pbest}_u$ represents an optimal historical location of the u-th particle, and Gbest represents the global optimal location.

S807: Generate a random number, and determine whether the currently generated random number is smaller than a preset mutation probability. If yes, proceed to S808. Otherwise, proceed to S809.

S808: Use a mutation operation to update the location of the particle through the following formula, and proceed to S812:

$$T_{uv} = X_{uv} + A(L\text{best} - X_{uv})$$

where $T_{uv}$ represents a location of the u-th particle after mutation in a v-th dimension, $X_{uv}$ represents current location information of the u-th particle in the v-th dimension, and A represents a magnification factor.

S809: Apply a random permutation function to the local optimal location to improve the diversity of a solution space:

$$L\text{best} := \text{permuting}(L\text{best})$$

where Lbest represents a location of an optimal solution found by the particle in the neighborhood, and permuting( ) represents the random permutation function.

In the present invention, by introducing the mutation operation and local random permutation of the solution space, the diversity of the solution space can be maintained in the optimization process, and the global searching ability can be enhanced, which helps to find a more optimal solution.

S810: Generate a test location of the particle through the following formula:

$$\text{Mutant} = X + F(L\text{best} - X)$$

where Mutant represents a location of a mutated particle, represents a current location of the particle, Lbest represents the local optimal location, and F represents the magnification factor.

S811: Use a crossover operator to perform a crossover operation on the current particle to generate a solution of the next generation, and proceed to S812.

S812: Calculate the fitness of each particle, and based on the fitness of the particles, update the global optimal location.

S813: Determine whether a maximum number of iterations is met, and if yes, output the optimal result. Otherwise, return to S805.

S9: Obtain real-time cutting force data, real-time acoustic emission signal data and real-time vibration signal data.

S10: Based on the real-time cutting force data, the real-time acoustic emission signal data and the real-time vibration signal data, monitor the tool wear state through the trained tool wear state monitoring model.

Optionally, tool wear states are classified as mild wear, moderate wear and severe wear.

Specifically, the real-time cutting force data, the real-time acoustic emission signal data and the real-time vibration signal data are obtained. Based on the result of feature importance analysis, the key features that affect the tool wear state are found. With the key features as priority and the remaining features as aiding, the key features are input into the trained tool wear state monitoring model to output the tool wear state.

In the present invention, by selecting the key features based on the feature importance analysis and inputting them into the trained tool wear state monitoring model, the prediction accuracy and computational efficiency of the model can be significantly improved, which not only optimizes the performance of the model and reduces redundant features and computational burden, but also enhances the stability and robustness of the model, thereby avoiding overfitting. In addition, by focusing on the most relevant features, a more accurate and flexible decision support can be provided for real-time monitoring of the tool wear state, thereby reducing the maintenance cost and improving the real-time responsiveness and adaptability of the system.

In a possible implementation, after S10, the method further includes:
  Record the tool wear state, and generate a tool wear state report.

In the present invention, real-time recording the tool wear state can provide valuable historical data for a subsequent analysis. By tracking wear changes of each tool throughout the entire life cycle, it is possible to clearly trace back to any specific point in time to help the engineers to understand the trends and historical events of wear, which is of great value for subsequent maintenance decisions and optimization operations.

The technical solutions provided in the embodiments of the present invention have at least the following beneficial effects.

(1) In the embodiments of the present invention, by extracting the statistical features and combining the wavelet transform with the singularity analysis, the processing flow of an original signal is effectively simplified, and the computational complexity is significantly reduced. By using the tool wear state monitoring model built through the random forest, large-scale features can be efficiently processed, thereby avoiding excessive consumption of computing resources and improving the real-time performance of the system and the processing efficiency.

(2) In the embodiments of the present invention, by preliminarily training the model, an effective wear assessment can be provided in the early stage of small signal changes, thereby guaranteeing that a preliminary prediction can be made even when the signal changes are not significant. In addition, by evaluating the importance of features, the key features that affect tool wear are screened out, thereby guaranteeing that the model focuses on the features that can effectively distinguish the wear state even at the early stage of small signal changes. Based on the key features, the model is finely trained, thereby further improving the ability of the model to identify an early wear state, thus significantly improving the monitoring accuracy.

Figure 2:
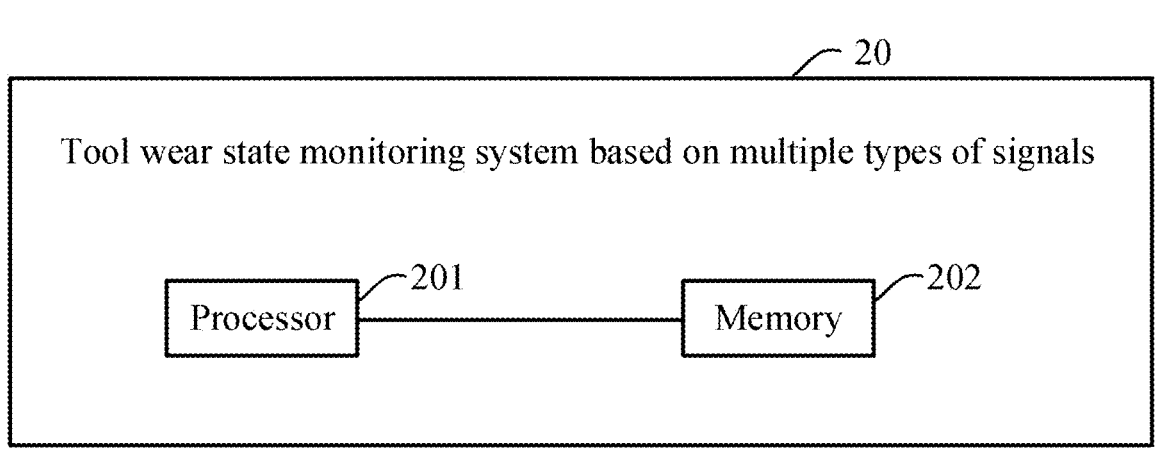
FIG. 2 is a schematic structural diagram of a tool wear state monitoring system based on multiple types of signals according to an embodiment of the present invention.

Reference is made to FIG. 2 of the specification, which shows a schematic structural diagram of a tool wear state monitoring system based on multiple types of signals according to the present invention.

The present invention further provides a tool wear state monitoring system 20 based on multiple types of signals, which is applied to the foregoing tool wear state monitoring method based on multiple types of signals. The tool wear state monitoring system includes:

a processor 201; and a memory 202 having computer readable instructions stored thereon, where the computer readable instructions, when executed by the processor 201, implement the tool wear state monitoring method based on multiple types of signals according to the method embodiments.

The tool wear state monitoring system 20 based on multiple types of signals according to the present invention can perform the above-mentioned tool wear state monitoring method based on multiple types of signals and implement the same or similar technical effects. To avoid repetition, details will not be described herein again.

The technical solutions provided in the embodiments of the present invention have at least the following beneficial effects.

(1) In the embodiments of the present invention, by extracting the statistical features and combining the wavelet transform with the singularity analysis, the processing flow of an original signal is effectively simplified, and the computational complexity is significantly reduced. By using the tool wear state monitoring model built through the random forest, large-scale features can be efficiently processed, thereby avoiding excessive consumption of computing resources and improving the real-time performance of the system and the processing efficiency.

(2) In the embodiments of the present invention, by preliminarily training the model, an effective wear assessment can be provided in the early stage of small signal changes, thereby guaranteeing that a preliminary prediction can be made even when the signal changes are not significant. In addition, by evaluating the importance of features, the key features that affect tool wear are screened out, thereby guaranteeing that the model focuses on the features that can effectively distinguish the wear state even at the early stage of small signal changes. Based on the key features, the model is finely trained, thereby further improving the ability of the model to identify an early wear state, thus significantly improving the monitoring accuracy.

It is to be understood that the processor in the embodiment of the present invention may be a central processing unit (CPU). The processor may further be another general-purpose processor, a digital signal (DSP), an application specific integrated circuit (ASIC), a field programmable gate array (FPGA), or another programmable logic device, discrete gate or transistor logic device, discrete hardware component, etc. The general-purpose processor may be a microprocessor, or any conventional processor, etc.

It is also to be understood that the memory in the embodiment of the present invention may be a volatile memory or a non-volatile memory or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, random access memories (RAMs) in many forms, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM), are available.

The foregoing embodiments may be entirely or partially implemented through software, hardware (e. g., a circuit), firmware, or any other combinations. When the software is used for implementation, the foregoing embodiments may be entirely or partially implemented in the form of a computer program product. The computer program product includes one or more computer instructions or a computer program. When the computer instructions or the computer program are loaded or executed on a computer, all or part of the process or functions according to the embodiments of the present invention are generated. The computer may be a general-purpose computer, a special purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (e. g., infrared, wireless or microwave) manner. The computer-readable storage medium may be any available medium capable of being accessed by the computer or a data storage device integrated by one or more available media, such as a server and a data center. The available medium may be a magnetic medium (e. g., a soft disk, a hard disk, and a magnetic tape), an optical medium (e. g., a DVD), or a semiconductor medium. The semiconductor medium may be a solid-state disk.

It is to be understood that the term "and/or" herein indicates merely a relationship for describing the related items, and represents three possible relationships. For example, "A and/or B" may represent the following three circumstances: A alone, both A and B, and B alone, where A and B may be singular or plural. In addition, the character "/" herein generally represents an "or" relationship of the successively related items. And it may also represent a "and/or" relationship. For details, reference may be made to the context for understanding.

In the present invention, "at least one" refers to one or more, and "a plurality of" refers to two or more. "At least one of the following items" or a similar expression thereof refers to any combination of these items, including any combination of a single item or multiple items. For example, "at least one of a, b and c" may represent: a, b, c, a-b, a-c, b-c, or a-b-c, where a, b and c may be single or multiple.

It is to be understood that in various embodiments of the present invention, the magnitude of the serial number of each of the foregoing processes does not mean a sequence of the order of execution, and the order of execution of each process should be determined by its function and inherent logic without constituting any limitation on the implementation processes of the embodiments of the present invention.

A person of ordinary skill in the art may notice that the exemplary units and algorithm steps described with reference to the embodiments disclosed herein can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of the present invention.

A person skilled in the art may clearly understand that for the convenience and brevity of the description, for a specific working process of the device, apparatus and unit described above, reference may be made to the corresponding process in the foregoing method embodiments. Details will not be described herein again.

In the several embodiments provided in the present invention, it is to be understood that the disclosed device, apparatus and method may be implemented in other manners. For example, the foregoing described apparatus embodiments are merely examples. For example, the unit division is merely logical function division and there may be other division manners in actual implementation. For example, multiple units or components may be combined or integrated into another device, or some features may be omitted or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and components displayed as units may or may not be physical units, that is, may be located in one position, or may be distributed on a plurality of network units. Some or all of the units may be selected according to actual needs to achieve objectives of the solutions of the embodiments.

In addition, functional units in the embodiments of the present disclosure may be integrated into one processing unit, or each of the units may be physically separated, or two or more units may be integrated into one unit.

In a case that the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be presented in the form of a software product. The computer software product is stored in a storage medium, and includes several instructions for causing one or more computer devices (which may be a personal computer, a server, a network device, or the like) to perform all or some of the steps of the methods described in the embodiments of the present invention. And the foregoing storage medium includes: various media that can store program code, such as a U disk, a mobile hard disk, a read-only memory (ROM), a random access memory (RAM), a diskette, or an optical disk.

An embodiment of the present invention provides a computer-readable storage medium having a computer program stored thereon. The program, when executed by a processor, implements the tool wear state monitoring method based on multiple types of signals according to the method embodiments.

The computer-readable storage medium according to the present invention can achieve the steps and effects of the tool wear state monitoring method based on multiple types of signals according to the above-mentioned method embodiments. To avoid repetition, details will not be described herein again.

The technical solutions provided in the embodiments of the present invention have at least the following beneficial effects.

(1) In the embodiments of the present invention, by extracting the statistical features and combining the wavelet transform with the singularity analysis, the processing flow of an original signal is effectively simplified, and the computation complexity is significantly reduced. By using the tool wear state monitoring model built through the random forest, large-scale features can be efficiently processed, thereby avoiding excessive consumption of computing resources and improving the real-time performance of the system and the processing efficiency.

(2) In the embodiments of the present invention, by preliminarily training the model, an effective wear assessment can be provided in the early stage of small signal changes, thereby guaranteeing that a preliminary prediction can be made even when the signal changes are not significant. In addition, by evaluating the importance of features, the key features that affect tool wear are screened out, thereby guaranteeing that the model focuses on the features that can effectively distinguish the wear state even at the early stage of small signal changes. Based on the key features, the model is finely trained, thereby further improving the ability of the model to identify an early wear state, thus significantly improving the monitoring accuracy.

The above descriptions are only specific implementations of the present invention, and the protection scope of the present invention is not limited thereto. Any changes or substitutions that are readily conceivable to a person skilled in the art within the technical scope disclosed in the present invention should all be included within the protection scope of the present invention. Therefore, the protection scope of the present invention should be subject to the protection scope of the claims.

The following points need to be explained:

(1) The drawings of the embodiments of the present invention only involve the structures involved in the embodiments of the present invention. For other structures, reference may be made to general designs.

(2) For the sake of clarity, in the drawings for describing the embodiments of the present invention, layers or regions are magnified or downscaled. That is, these drawings are not drawn to an actual scale. It is to be understood that when an element such as a layer, a film, a region or a substrate is referred to as being located "above" or "below" another element, the element may be "directly" located "above" or "below" the another element, or there may be an intermediate element.

(3) The embodiments of the present invention and features in the embodiments may be mutually combined to obtain a new embodiment as long as there is no conflict.

The above descriptions are only specific implementations of the present invention, and the protection scope of the present invention is not limited thereto. The protection scope of the present invention should be subject to the protection scope of the claims.

What is claimed is:

1. A tool wear state monitoring method based on multiple types of signals, characterized by comprising:
   S1: obtaining cutting force data, acoustic emission signal data and vibration signal data of a tool in a machining process;
   S2: extracting a plurality of statistical features from the cutting force data and the acoustic emission signal data;
   S3: extracting a singularity feature from the vibration signal data by combining a singularity analysis with a wavelet transform;
   S4: building a tool wear state monitoring model based on a random forest;
   S5: using the extracted statistical features and the singularity feature as an input to preliminarily train the tool wear state monitoring model, and outputting preliminary tool wear results;
   S6: evaluating whether the preliminary tool wear result meets a preset condition; if yes, proceeding to S9; otherwise, proceeding to S7;
   S7: using a preliminarily trained tool wear state monitoring model to evaluate the importance of each statistical feature and singularity feature to determine key features that affect a tool wear state;
   S8: based on the key features, refining the tool wear state monitoring model;
   S9: obtaining real-time cutting force data, real-time acoustic emission signal data and real-time vibration signal data; and
   S10: based on the real-time cutting force data, the real-time acoustic emission signal data and the real-time vibration signal data, monitoring the tool wear state through the trained tool wear state monitoring model.

2. The tool wear state monitoring method based on multiple types of signals according to claim 1, characterized in that the statistical features specifically comprise:
   a maximum value, median, average, standard deviation, peak value and root mean square of the cutting force data; and
   a maximum value, median, average, standard deviation and root mean square of the acoustic emission signal data.

3. The tool wear state monitoring method based on multiple types of signals according to claim 1, characterized in that the S3 specifically comprises:
   S301: using the wavelet transform to analyze multi-scale features of the vibration signal data;
   S302: performing a modulus maximum analysis on a wavelet transform coefficient at each scale to determine a number and intensity of maximum points;
   S303: based on the number and intensity of the maximum points, calculating a Lipschitz index at each scale;

$$\alpha_q = \frac{1}{N_q} \sum_{p=1}^{N_q} \log_2\left(\frac{I(m_p)}{I(m_{p-1})}\right)$$

wherein $\alpha_q$ represents a Lipschitz index at a q-th scale, $N_q$ represents a number of maximum points at a q-th scale, $m_p$ represents a p-th maximum point, $m_{p-1}$ represents a p−1th maximum point, $I(m_p)$ represents an intensity of the p-th maximum point, $I(m_{p-1})$ represents an intensity of the p−1th maximum point, and log represents a logarithmic function;

S304: performing weighted averaging on the Lipschitz index at each scale to obtain a comprehensive Lipschitz index of the vibration signal data:

$$HE = \frac{1}{Q} \sum_{q=1}^{Q} \alpha_q \cdot \frac{N_q}{\sum_{k=1}^{Q} N_k}$$

wherein HE represents the comprehensive Lipschitz index, Q represents a total number of scales decomposed after the wavelet transform, $N_k$ represents a number of maximum points at a k-th scale, and $$\sum_{k=1}^{Q} N_k$$

represents a sum of numbers of maximum points at the Q scales;

S305: using the comprehensive Lipschitz index as an output of the singularity feature.

4. The tool wear state monitoring method based on multiple types of signals according to claim 1, characterized in that the S4 specifically comprises:
   S401: based on the statistical features, building an original dataset;
   S402: randomly generating a plurality of bootstrapped samples from the original dataset; wherein each bootstrapped sample contains a plurality of sample data;
   S403: based on each bootstrapped sample, building a plurality of decision trees:

$$T_b(x, h_b) = \sum_{m=1}^{M} \mu_m I(x \dot\in R_m)$$

wherein $T_b(x, h_b)$ represents a predicted value of a b-th decision tree at input data x, x represents an input data point, $h_b$ represents a tree structure of the b-th decision tree, M represents a total number of leaf nodes in the decision trees, $\mu_m$ represents an average of target values of all the samples in a m-th leaf node, $R_m$ represents a sample set of the m-th leaf node, I( ) represents an indicator function, $I(x \grave{o} R_m)=1$ represents a sample x belonging to the leaf node $R_m$, and $I(x \grave{o} R_m)=0$ represents the sample x not belonging to the leaf node $R_m$;

S404: combining the decision trees to build the tool wear state monitoring model:

$$\hat{Y}(x) = \frac{1}{B}\sum_{b=1}^{B} T_b(x, h_b)$$

wherein $\hat{Y}(x)$ represents a final predicted value of the random forest for the input data x, B represents a total number of trees in the random forest, x represents the input data point, $h_b$ represents the tree structure of the b-th decision tree, and $T_b(x, h_b)$ represents the predicted value of the b-th decision tree at the input data x.

5. The tool wear state monitoring method based on multiple types of signals according to claim 4, characterized in that the S403 specifically comprises:
   S4031: selecting a plurality of splitting variables in the bootstrapped samples;
   S4032: selecting a split point in each split variable, and dividing the split variables into left and right subsets based on the split point;
   S4033: using minimization of a residual sum of squares of each subset as a goal to determine an optimal split point:

$$\min_{j,s}\left[\min_{\mu_1}\sum_{x_i \in R_1(j,s)}(y_i - \mu_1)^2 + \min_{\mu_2}\sum_{x_i \in R_2(j,s)}(y_i - \mu_2)^2\right]$$

wherein min represents minimization, $\mu_1$ represents an average of target variables in the left subset, $x_i$ represents a feature vector of a i-th sample, $R_1$ represents a split left subset, $y_i$ represents a target variable of the i-th sample, $\mu_2$ represents an average of target variables in the right subset, $R_2$ represents a split right subset, j represents a feature, and s represents a split point;
   S4034: based on the optimal split point, dividing a current node into a left sub-node and a right sub-node, and recursively executing steps S4031 to S4034 on the left sub-node and the right sub-node;
   S4035: in a case that a number of samples in the bootstrapped samples is lower than a preset number or a depth of the trees reaches a maximum depth, the splitting is stopped, and the building of each decision trees is completed.

6. The tool wear state monitoring method based on multiple types of signals according to claim 1, characterized in that the preset condition is specifically: prediction accuracy of the preliminary tool wear result being greater than eighty percent.

7. The tool wear state monitoring method based on multiple types of signals according to claim 1, characterized in that the S7 specifically comprises:
   S701: calculating feature importance evaluation values of the statistical features and the singularity feature through the following formula:

$$VarImp(x_i) = \frac{1}{N_T}\sum_{T}\sum_{t \in T: v(s_t)=x_i} p(t)\Delta_i(s_t, t)$$

$$\Delta_i(s_t, t) = i(t) - p_1 i(t_1) - p_2 i(t_2)$$

$$i(t_1) = \sum_{x_i \in R_1}(y_i - \hat{y}_1)^2, \; i(t_2) = \sum_{x_i \in R_2}(y_i - \hat{y}_2)^2$$

wherein $VarImp(x_i)$ represents an importance evaluation value of a feature $x_i$, T represents a decision tree in the random forest, $N_T$ represents a total number of trees in the random forest, $v(s_t)$ represents a feature of a t-th split node, $v(s_t)=x_i$ represents the feature of the t-th split node being split by the feature $x_i$, p(t) represents a sample proportion in a node t, $\Delta_i(s_t, t)$ represents a reduction of a residual sum of squares brought about by the feature $x_i$ when the t-th node is split, i(t) represents a residual sum of squares of the t-th node, $p_1$ represents a sample proportion of a left sub-node, $p_2$ represents a sample proportion of a right sub-node, $i(t_1)$ represents a residual sum of squares of the left sub-node, $i(t_2)$ represents a residual sum of squares of the right sub-node, $R_1$ represents a split left subset, $R_2$ represents a split right subset, $x_i$ represents a i-th sample, $y_i$ represents a target variable of the i-th sample, $\hat{y}_1$ represents an average of target variables of samples in the left subset, and $\hat{y}_2$ represents an average of target variables of samples in the right subset;
   S702: sorting the importance evaluation values of each feature in descending order, and selecting the features corresponding to the feature importance evaluation values with the highest ranking as the key features.

8. The tool wear state monitoring method based on multiple types of signals according to claim 1, characterized in that a manner of refining the tool wear state monitoring model specifically comprises:
   using minimization of a function value of a mean squared error loss function as a goal to refine the tool wear state monitoring model through an improved particle swarm optimization algorithm.

9. The tool wear state monitoring method based on multiple types of signals according to claim 1, characterized in that after the S10, the method further comprises:
   recording the tool wear state, and generating a tool wear state report.

10. A tool wear state monitoring system based on multiple types of signals, characterized by comprising:
   a processor;
   a memory having a computer-readable instruction stored thereon, the computer-readable instruction, when executed by the processor, implementing the tool wear state monitoring method based on multiple types of signals according to any one of claim 1.

* * * * *